April 16, 1968     H. B. MILLER, JR     3,377,728
METHOD AND APPARATUS FOR ARRANGING ALPHA-NUMERIC INDICIA
Filed Oct. 22, 1965
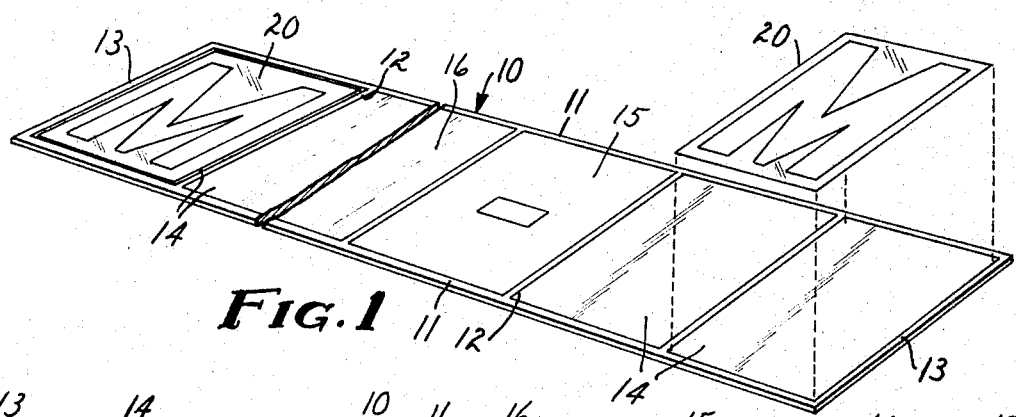
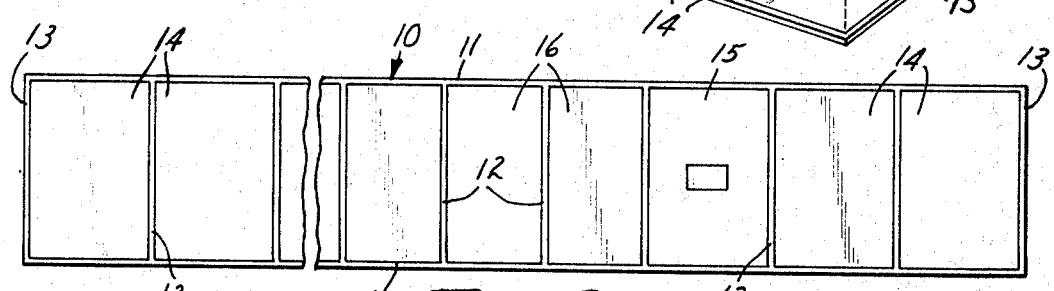
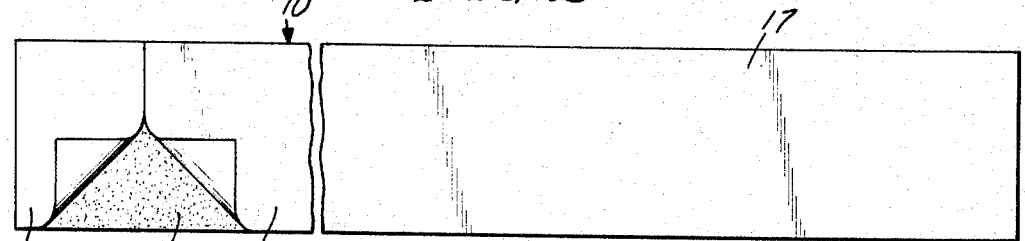
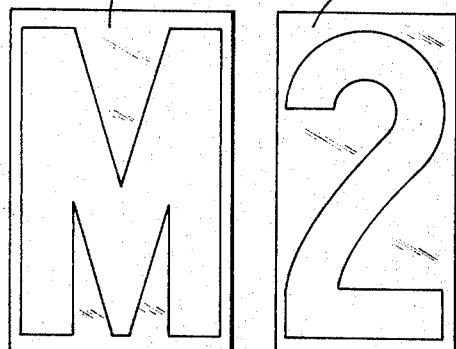
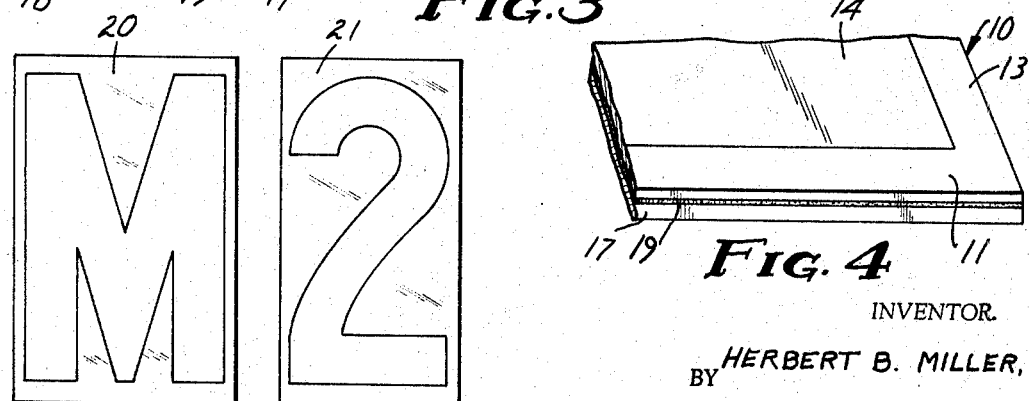
INVENTOR.
BY HERBERT B. MILLER, JR.
Meyers & Peterson 3,377,728
METHOD AND APPARATUS FOR ARRANGING ALPHA-NUMERIC INDICIA
Herbert Bernette Miller, Jr., 3835 Shady Oak Road, Hopkins, Minn. 55343
Filed Oct. 22, 1965, Ser. No. 501,773
1 Claim. (Cl. 40—125)

ABSTRACT OF THE DISCLOSURE

A series of opaque indicia bearing transparent panels are adhesively secured to a base having properly colored areas to receive the several panels and to thus give a finished appearance to the assembly.

---

The present invention relates generally to a display system for arranging certain indicia or information on a pre-formed base matrix, and more specifically to such a system for displaying alpha-numeric indicia within predetermined or prescribed zones defined on the surface of said pre-formed base matrix member.

Frequently, it becomes necessary to label, define, or otherwise display information or indicia on various objects. For example, various regulatory procedures of certain governmental agencies will frequently set forth prescribed labeling requirements for indicating certain information on objects such as motor vehicles, or boats. Since the specific licensing requirements or other requirements may change from time-to-time, or since the specific registration number for a given purpose may be temporary or may change from time-to-time it is frequently desirable to display the information in a manner which is neat, legible, easy to apply, and yet reasonably permanent. In accordance with the present invention, such a system is provided wherein an individual may display the information such as an alpha-numeric indicia series or the like in such a manner that the arrangement will always appear neat, legible, and also readily adapted for preparing in accordance with the immediate requirements of the display situation.

When a series of characters are displayed on a suitable background, experience has shown that unskilled artisans experience considerable trouble when applying a thin flexible film of a pre-formed configuration on an ordinary backing sheet. Problems develop in the arrangement of the characters, since they will become distorted, bent, skewed, or otherwise misaligned.

The system of the present invention generally includes a base matrix member which is generally opaque and having a background of a first color, this background color being confined within outline zones of a second and contrasting color. The alpha-numeric indicia members are arranged to be displayed or disposed upon the surface of the base matrix, these indicia members comprising a generally transparent base having an opaque alpha-numeric numeral formed on the surfaces and being of a color which is in contrast to the first color. Generally, for most purposes, black outline and numerals may be disposed on a base matrix wherein the base matrix has an opaque white background. For convenience in applying the alpha-numeric indicia members to the base matrix, a generally transparent pressure sensitive adhesive is available on the back of the individual alpha-numeric indicia members, and also, if desired, the back surface of the brass matrix may be provided with a film of a pressure sensitive adhesive for bonding the matrix to the item being labeled or otherwise identified.

When the individual alpha-numeric indicia members are applied to the base matrix, the disposition may be made within the confines of the predetermined zones without disturbing the general, over all appearance of the finished display. This is possible since the background of the individual alpha-numeric display characters is transparent, and will therefore permit a view of the border zones between the individual characters to be unobstructed. Therefore, the individual characters may be slightly canted, or otherwise applied without disturbing the overall effect of the finished product. A slight canting of individual characters will normally not be noticeable if the zone or border between the various characters of the indicia is displayed in an ordinary, regular, and otherwise predetermined fashion.

Therefore, it is an oject of the present invention to provide an improved means for displaying alpha-numeric indicia, particularly wherein the alpha-numeric indicia is disposed with predetermined zones on the surface of a pre-formed base matrix.

It is a further object of the present invention to provide an improved system for displaying alpha-numeric indicia wherein individual characters on a display scheme may be displayed in a somewhat canted or misaligned form without disturbing the regular and orderly appearance of the finished or completed combination of display indicia.

It is yet a further object of the present invention to provide an improved means for displaying alpha-numeric indicia wherein a base matrix is provided with an opaque background, and contrasting border zones, and wherein the alpha-numeric indicia is formed with an opaque character surrounded by a transparent form.

Other and further objects of the present invention will become apparent to those skilled in the art upon a study of the following specification, appended claims, and accompanying drawings, wherein:

FIGURE 1 is a perspective view of a display system prepared in accordance with the present invention, and showing one of the alpha-numeric characters in a raised or removed disposition relative to the surface of a base matrix;

FIGURE 2 is a top plan view of a base matrix member fabricated in accordance with the present invention;

FIGURE 3 is a view of the reverse or back surface of the base matrix shown in FIGURE 2;

FIGURE 4 is a detail perspective view, partially in section, and on a somewhat enlarged scale, showing the edge of a base matrix fabricated in accordance with the present invention; and FIGURES 5 and 6 represent alpha-numeric indicia elements arranged to be disposed in predetermined relationship on the surface of a base matrix shown in FIGURES 2 and 3.

In accordance with the preferred modification of the present invention, the alpha-numeric indication or display system generally designated 10 includes a base matrix element 11 having a top display surface thereon, and having a reverse or back surface, preferably provided with a pressure sensitive adhesive, as defined in full detail hereinafter. The base matrix member 11 is provided with a plurality of opaque border or zone defining lines 12 prepared in a contrasting color from the background or indicia receiving areas 16. These border of zone defining lines are also shown at 13, wherein they define the edge or border of the entire base matrix system. The areas identified by the numeral 14 represent individual zones defined within the matrix and are also opaque in nature, with a color in sharp contrast to the border. For most purposes, it is preferred that a white background or indicia receiving area be utilized with black borders. It will be further appreciated that these coloring schemes may be reversed, or otherwise changed in order to fulfill both governmental requirements and aesthetic desires. In certain cases it is desirable that an indicia separating zone be utilized to offset, separate, or otherwise define the arrangement of the individual members of the alpha-numeric indicating system. Such a separating is shown at 15, the center of the zone being provided with a hyphen or dash, or other indication. The indicia receiving surface zones as shown at 16, are each inscribed within zone defining lines. Thus, the individual characters may be disposed within the confines of the zones, as required.

In order to apply the matrix element to the surface upon which the characters will be displayed, the reverse surface is provided with a pair of backing strips 17 and 18, separated along a separation line, these backing strips covering a pressure sensitive adhesive 19 on the base matrix. In lieu of pressure sensitive adhesives, thermally responsive adhesives may be used in certain operations, if desired. For flexibility of operation, however, the pressure sensitive adhesive has been found to be most generally acceptable. Pressure sensitive adhesives are, of course, commercially available.

For general purposes, the matrix member 11 may be fabricated from a thin flexible film of an ink receiving material, such as a film of vinyl plastic having a thickness, for example, of 5 mils. Of course, other suitable materials may be used such as certain flexible polyester ink-receiving materials, or natural occurring material such as paper or the like. It is, of course, necessary that the pressure sensitive adhesive used be compatible with the characteristics of the material from which the matrix is fabricated. Pressure sensitive adhesives compatible with vinyl films are of course, commercially available.

Particular attention is now directed to FIGURE 4 of the drawing wherein the detailed view shows the film of pressure sensitive adhesive sandwiched between the matrix member 11 and the backing strip 17. It will be appreciated that the scale may not be in accordance with the precise scale used, the example shown as such being drawn to an exaggerated scale imposed by limitations of draftsmanship.

Referring now to FIGURES 5 and 6, the alpha-numeric characters shown are on a transparent backing member such as the members 20 and 21. The transparent base member 20 carries the alpha-numeric numeral M while the transparent base member 21 carries the numeral "2" thereon. The backs of the individual transparent base member 20 and 21 are provided with a film of a pressure sensitive adhesive, as is shown at 19 in FIGURE 4. For purposes of this disclosure, it will be appreciated that the individual transparent base members 20 and 21 carrying the alpha-numeric indicia thereon, will be provided with a film of a transparent pressure sensitive adhesive, this adhesive film being preferably protected with a suitable backing strip as is provided at 17 and 18 for the base matrix 11. Pressure sensitive adhesives of this type are commercially available.

Referring now to the arrangement shown in FIGURE 1, it will be observed that the character on the transparent base 20 is being applied to the zone defined within the edge boundaries on the surface of the base matrix. It is possible to display this character at this point without extreme concern or care being necessary in the manner in which this character is applied to the surface. Slight canting, or other misalignment will not be apparent when confined within the zone, since the regular features of the base matrix are visible through the transparent portions of the transparent sheet 20, and this enhances the overall physical appearance of the system, as such. The member may be applied to the surface to the base matrix by merely removing the backing strip which is provided, and thereafter placing the completed numeral on the surface of the matrix, displayed as desired.

It will be appreciated and recognized that the examples given herein are for purposes of illustration only, and there is accordingly no intent to limit the scope of protection to these specific examples alone, since those skilled in the art may depart from these specific examples without actually departing from the spirit of the invention.

I claim:

1. Means for displaying alpha-numeric indicia within predetermined zones on a preformed base matrix which comprises, in combination:

(a) a base matrix comprising an opaque sheet having a film of pressure sensitive adhesive applied to the back thereof with a display surface having a background of a first color confined within outlining zones of rectangular shape which are contiguously arranged and of a second and contrasting color, and (b) alpha-numeric indicia members arranged to be disposed and secured upon said display surface, said indicia members comprising a generally transparent base with a transparent film of a pressure sensitive adhesive on the back thereof and having an opaque indicia character formed thereon within a limited portion only of the area of said transparent base member and of said second and contrasting color, said indicia character being of a color which is in contrast to said first color.

References Cited

UNITED STATES PATENTS

| 1,830,960 | 11/1931 | Philibert | 40—125 |
| 2,549,419 | 4/1951 | Callahan | 40—125 |
| 2,896,351 | 7/1959 | Johnson | 40—158 |
| 2,936,540 | 5/1960 | Power | 40—63 |

FOREIGN PATENTS 567,628    5/1958    Belgium.

EUGENE R. CAPOZIO, *Primary Examiner.*

W. J. CONTRERAS, *Examiner.*